United States Patent [19]

Akutagawa et al.

[11] Patent Number: 5,053,476

[45] Date of Patent: Oct. 1, 1991

[54] EPOXY RESIN COMPOSITION BASED ON BISPHENOL EPOXY, POLYETHERPOLYOL, ANHYDRIDE AND IMIDAZOLE

[75] Inventors: Ichiro Akutagawa, Nagareyama; Kunimitsu Matsuzaki, Yono; Toshio Matsuo; Toru Shirose, both of Koshigaya, all of Japan

[73] Assignee: Somar Corporation, Japan

[21] Appl. No.: 370,305

[22] Filed: Jun. 23, 1989

[30] Foreign Application Priority Data

Jun. 24, 1988 [JP] Japan ................................. 63-154890

[51] Int. Cl.$^5$ ..................... C08G 59/24; C08G 59/40; C08L 71/02; H01B 3/40
[52] U.S. Cl. ..................... 528/103; 523/440; 523/442; 523/443; 523/444; 528/94; 528/110; 525/407
[58] Field of Search .................. 528/103, 94; 523/440, 523/442, 443, 444

[56] References Cited

U.S. PATENT DOCUMENTS

| | | | |
|---|---|---|---|
| 4,434,286 | 2/1984 | Burhans et al. ....................... | 528/110 |
| 4,571,314 | 2/1986 | Suzuki et al. ....................... | 430/271 |
| 4,576,896 | 3/1986 | Suzuki et al. ....................... | 430/271 |

FOREIGN PATENT DOCUMENTS

| | | |
|---|---|---|
| 0051311 | 12/1082 | European Pat. Off. . |
| 0144705 | 9/1985 | European Pat. Off. . |
| 2447036 | 8/1976 | Fed. Rep. of Germany . |

OTHER PUBLICATIONS

Patent Abstracts of Japan vol. 6, No. 102 (C-107) (980), 11th Jun. 1982.
Encyclopedia of Polymer Science and Engineering, vol. 5, 1985, pp. 792-828, John Wiley & Sons, New York, U.S.
Encyclopedia of Polymer Science and Engineering, vol. 6, 1986, pp. 348-367, John Wiley & Sons, New York, U.S.

*Primary Examiner*—Earl Nielsen
*Assistant Examiner*—Frederick Krass
*Attorney, Agent, or Firm*—Lorusso & Loud

[57] ABSTRACT

An epoxy resin composition suitable for use as a casting resin for the potting of an ignition coil is disclosed which comprises:
(A) a mixture containing
   ($a_1$) a liquid, Bisphenol-type epoxy resin, and
   ($a_2$) an inorganic filler,
   ($a_3$) a polyether polyol; and
(B) a liquid curing agent including
   ($b_1$) an acid anhydride, and
   ($b_2$) an imidazole compound.

14 Claims, No Drawings

EPOXY RESIN COMPOSITION BASED ON BISPHENOL EPOXY, POLYETHERPOLYOL, ANHYDRIDE AND IMIDAZOLE

BACKGROUND OF THE INVENTION

This invention relates to an epoxy resin composition suitable for use as a casting resin for packaging of a coil such as an ignition coil.

An ignition coil for automobiles is generally packaged in a plastic casing together with primary and secondary terminals. The packaging, which is generally called "potting" is carried out by placing the coil and itd associated parts within the casing, filling the space within the casing with a casting resin, and curing the resin.

Such a casting resin should satisfy the following requirements: (1) the resin can smoothly penetrate into the intersticies of the coil windings, (2) the resin can be cured within a short period of time, (3) the resin can be cured with minimized generation of stresses, (4) the cured resin can withstand a high voltage and (5) the resin should not corrode the materials constituting the coil. Known casting resins including known epoxy resin compositions are not fully satisfactory because some of the above requirements cannot be fully met thereby.

SUMMARY OF THE INVENTION

It is, therefore, an object of the present invention to provide an epoxy resin composition which can meet all of the above requirements.

It is an important object of the present invention to provide an epoxy resin composition which is suitably used for encapsulation of automobile ignition coils.

In accomplishing the foregoing objects, the present invention provides an epoxy resin composition comprising:

(A) a mixture containing
  ($a_1$) a liquid, Bisphenol-type epoxy resin, and
  ($a_2$) an inorganic filler,
  ($a_3$) a polyether polyol; and
(B) a liquid curing agent including
  ($b_1$) an acid anhydride, and
  ($b_2$) an imidazole compound.

Other objects, features and advantages of the present invention will become apparent from the detailed description of the invention to follow.

DETAILED DESCRIPTION OF THE INVENTION

The term "Bisphenol-type epoxy resin" used in the present specification is intended to refer to Bisphenol A epoxy resin, Bisphenol F epoxy resin, Bisphenol AD epoxy resin and a mixture thereof. The Bisphenol-type epoxy resin preferably has an epoxy equivalent of 156-250. The term "epoxy equivalent" used in the present specification is intended to refer to so-called "weight per epoxy equivalent" which is a weight (g) of the epoxy resin providing 1 g equivalent of the epoxy group.

The inorganic filler to be used in the present invention may include, for example, silica, aluminum hydroxide, alumina, titania, calcium carbonate, talc, clay, calcium silicate, mica, glass fibers, glass powder, glass flakes and whiskers. The inorganic filler is used in an amount of 1–400 parts by weight, preferably 10–300 parts by weight, per 100 parts by weight of the Bisphenol-type epoxy resin.

The inorganic filler preferably has an average particle size of 50 $\mu$m or less. It is preferable to use as the filler a mixture of 60–95% by weight a first, coarse filler having an average particle size of 2–50 $\mu$m and 40–5% by weight of a second, fine filler having an average particle size of 0.1–1.5 $\mu$m, for reasons of homogeneity of dispersion of the filler in the epoxy resin composition. That is, absence of the second filler tends to cause precipitation or sedimentation of coarse filler particles, which in turn results in reduction of resistance to voltage of the cured resin when subjected to heat shock by repeated heating and cooling. Aluminum hydroxide is suitably used as the second filler, though any other fillers such as described above may be used.

For the purpose of minimizing the generation of stresses during curing and of preventing the corrosion of a bobbin around which a copper wire is wound, a polyether polyol having a number of ether linkages and hydroxyl groups is incorporated into the epoxy resin composition. The present inventors have found that packaged coils such as ignition coils deteriorate with time upon repeated use due to corrosion of plastic bobbins, especially bobbins formed of a polycarbonate resin and that an acid anhydride curing agent contained in the epoxy resin compositions is responsible for such corrosion. It has now been found that a polyether polyol can effectively prevent the acid anhydride from chemically attack the bobbins, without adversely affecting the curing efficiency.

Illustrative of suitable polyether polyol compounds are compounds expressed by the following formulas:

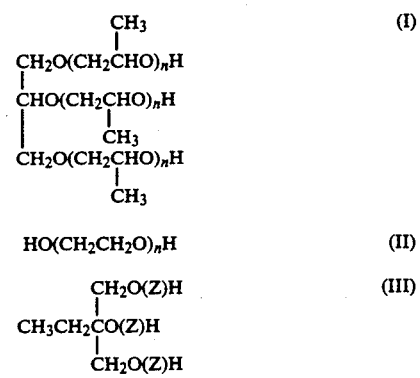

wherein n is a positive integer and Z is a polyoxyalkylene group consisting essentially of a plurality of monomer units, the monomer unit being an ethylene oxide monomer unit ($-CH_2CH_2O-$) and a propylene oxide monomer unit ($-CH_2CHCH_3O-$). The polyether polyol is suitably used in an amount of 4–30% based on the weight of the Bisphenol-type epoxy resin.

As a curing agent for curing the above epoxy resin, a specific combination of an acid anhydride and an imidazole compound is used. By this, curing time of the epoxy resin composition according to the present invention is suitably shortened. The acid anhydride is preferably methyltetrahydrophthalic anhydride, methylhexahydrophthalic anhydride, methylnadic anhydride and methylbutenyltetrahydrophthalic anhydride. The imidazole compound is used as a curing accelerator and is preferably 2-ethyl-4-methylimidazole or 1-benzyl-2-methylimidazole.

The acid anhydride is used in an amount of 0.5–1.5 mole, preferably 0.7–1.2 mole per one equivalent of the epoxy resin of the Bisphenol-type epoxy resin. The imidazole compound is preferably used in an amount of 0.2–5.0%, preferably 0.5–2.0%, based on the weight of the acid anhydride.

The epoxy resin composition according to the present invention may further contain an reactive diluent which has at least one epoxy group in its molecule and which is low in viscosity. Illustrative of suitable diluents are phenyl glycidyl ether, polyethylene glycol diglycidyl ether, polypropylene glycol diglycidyl ether, 1,6-hexanediol diglycidyl ether, methyl glycidyl ether, propyl glycidyl ether, pentaerithrytol polyglycidyl ether, sorbitol polyglydidyl ether and 2-ethylhexyl glycidyl ether. The diluent is used in an amount of 1–50% based on the weight of the Bisphenol-type epoxy resin. The addition of the diluent is effective in controlling the viscosity of the epoxy resin composition to an optimum range such as 700 cps or less at 60° C.

The epoxy resin composition according to the present invention can contain one or more additives such as a flame retarder, a coloring agent, an antifoaming agent and a plasticizer, as desired.

During storage and transportation, the composition according to the present invention is preferably rendered in the form of a two-component type pack consisting of the mixture (A) as a first component and the curing agent (B) as a second component. The above-mentioned diluent and the additives may be incorporated into the first component pack (A). In use, the components (A) and (B) are mixed and the mixture is poured into a casing within which a coil is placed. The resin composition is then cured, for example, at a temperature of 100°–150° C. for 90–180 minutes.

The following examples will further illustrate the present invention, in which "part" is by weight.

EXAMPLE 1

An epoxy resin mixture (A) and a curing agent (B) having the following formulations were prepared:

| Epoxy resin mixture (A): | |
| --- | --- |
| Bisphenol A epoxy resin*1 | 80 parts |
| 1,6-Hexanediol diglycidyl ether*2 | 20 parts |
| Polyether polyol*3 | 4 parts |
| Silicone antifoamer*4 | 0.1 part |
| Silica | 220 parts |
| Curing agent (B): | |
| Methyltetrahydrophthalic anhydride | 85 parts |
| 1-Benzyl-2-methylimidazole | 0.7 part |

*1Epikote 828, manufactured by Yuka Shell Epoxy Inc.
*2ADECA ED-503, manufactured by Asahi Denka K. K.
*3Compound of the formula (I) given above, molecular weight: 600
*4SILICONE KS-603, manufactured by Shinetsu Silicone K. K.

The thus obtained epoxy resin mixture (A) and the curing agent (B) were blended with a blending ratio (A)/(B) of 1:1 (wt/wt) to obtain an epoxy resin composition having a viscosity at 60° C. of 500 cps.

A coil having a bobbin formed of a polycarbonate and primary and secondary coil wound around the bobbin was prepared. The both coils were separated from each other by a partition (a sword-guard-like fin) formed around the bobbin. The primary coil was formed from a winding (200 turns) of a copper wire having 0.6 mm while the secondary coil was formed from a winding (1000 turns) of a copper wire having 0.3 mm. The coil was disposed within a casing formed of a polybutylene terephthalate resin. The above epoxy resin composition was poured into the casing while maintaining the inside of the casing at 60° C. under vacuum and the cured at 110° C. for 3 hours.

The primary coil of the resulting packaged coil was impressed with a voltage so that a voltage of 7–10 KV was induced. No defect by leakage was detected. The packaged coil was cut to inspect the bobbin and the windings. It was confirmed that the resin penetrated into and filled the entire interstices of the windings. Also no corrosion of the bobbin was observed.

EXAMPLES 2 and 3

Example 1 was repeated in the same manner as described except that the polyether polyol was used in amounts of 15 parts (Example 2) and 30 parts (Example 3). The epoxy resin compositions of Examples 2 and 3 showed viscosity at 60° C. of 420 and 380 cps, respectively. The packaged coils were tested in the same manner as in Example 1. As a result, neither defect by leakage nor corrosion of the bobbins was detected. The cured resin was found to fill the entire interstices of the windings.

EXAMPLE 4

Example 1 was repeated in the same manner as described except that Bisphenol F epoxy resin (Epikote 807, manufactured by Yuka Shell Epoxy Inc.) was used in lieu of the Bisphenol A epoxy resin and that no diluent was used. The epoxy resin composition showed a viscosity at 60° C. of 480 cps. Neither defect by leakage nor corrosion of the bobbins was detected. The cured resin was found to fill the entire interstices of the windings.

EXAMPLE 5

Example 1 was repeated in the same manner as described except that a mixture of 190 parts of silica and 30 parts of aluminum hydroxide (HIGILITE H-42M, manufactured by Showa Denko K. K.) was used in lieu of the 220 parts of silica. The resulting epoxy resin composition had excellent homogeneity and no precipitates or sediments were detected. The viscosity was 420 cps at 60° C. The tests revealed no defect by leakage, no corrosion of the bobbin and good penetrability.

COMPARATIVE EXAMPLE 1

Example 1 was repeated in the same manner as described except that no polyether polyol was used. The resulting epoxy resin composition showed a viscosity at 60° C. of 550 cps and good penetrability into the coil windings. However, the bobbin was found to be whitened and corroded. Defect by leakage was found to occur.

EXAMPLE 6

An epoxy resin mixture (A) and a curing agent (B) having the following formulations were prepared:

| Epoxy resin mixture (A): | |
| --- | --- |
| Bisphenol F epoxy resin*5 | 90 parts |
| 1,6-Hexanediol diglycidyl ether*2 | 10 parts |
| Polyether polyol*3 | 16 parts |
| Silicone antifoamer*4 | 0.1 part |
| Aluminum hydroxide*6 | 30 parts |
| Amorphous soft silica*7 | 80 parts |
| Crystalline silica*8 | 108 parts |
| Pigment*9 | 3 parts |

| Curing agent (B): | |
|---|---|
| Methyltetrahydrophthalic anhydride | 100 parts |
| 1-Benzyl-2-methylimidazole | 0.7 part |

*²the same as used in Example 1
*³the same as used in Example 1
*⁴the same as used in Example 1
*⁵Epikote 807, manufactured by Yuka Shell Epoxy Inc.
*⁶HIGILITE H-42M, manufactured by Showa Denko K. K.
*⁷IMSIL A-25, manufactured by K. K. Tatsumori
*⁸CRYSTALITE A-1, manufactured by K. K. Tatsumori
*⁹Black iron oxide The thus obtained epoxy resin mixture (A) and the curing agent (B) were blended with a blending ratio (A)/(B) of 100/27 (wt/wt) to obtain an epoxy resin composition. The composition was found to be very suited as a casting resin for potting coils.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An epoxy resin composition having a viscosity at 60° C. of 700 cps or less and comprising:
   (A) a mixture containing:
      ($a_1$) a liquid, Bisphenol epoxy resin, and
      ($a_2$) an inorganic filler,
      ($a_3$) a polyether polyol, and
      ($a_4$) a reactive diluent having at least one epoxy group; and
   (B) a liquid curing agent including
      ($b_1$) an acid anhydride, and
      ($b_2$) an imidazole compound, wherein the amounts of said polyether polyol and said reactive diluent are 4–30% and 1–50%, respectively, based on the weight of the Bisphenol epoxy resin.

2. A composition as claimed in claim 1, wherein the Bisphenol epoxy resin is Bisphenol A epoxy resin or Bisphenol F epoxy resin and has an epoxy equivalent of 156–250.

3. A composition as claimed in claim 1, wherein the inorganic filler has an average particle size of 50 μm or less.

4. A composition as claimed in claim 3, wherein the inorganic filler is at least one member selected from the group consisting of silica, aluminum hydroxide, alumina, titania, calcium carbonate, talc, clay, calcium silicate, mica, glass fibers, glass powder, glass flakes and whiskers.

5. A composition as claimed in claim 1, wherein the inorganic filler is a mixture of 60–95% by weight of a first, coarse filler having an average particle size of 2–50 μm and 40–5% by weight of a second, fine filler having an average particle size of 0.1–1.5 μm.

6. A composition as claimed in claim 5, wherein said first and second fillers are each at least one member selected from the group consisting of silica, aluminum hydroxide, alumina, titania, calcium carbonate, talc, clay, calcium silicate, mica, glass fibers, glass powder, glass flakes and whiskers.

7. A composition as claimed in claim 1, wherein the inorganic filler is used in an amount of 1–400 parts by weight per 100 parts by weight of the Bisphenol epoxy resin.

8. A composition as claimed in claim 1, wherein the acid anhydride is a compound selected from the group consisting of methyltetrahydrophthalic anhydride, methylhexahydrophthalic anhydride, methylnadic anhydride and methylbutenyltetrahydrophthalic anhydride.

9. A composition as claimed in claim 1, wherein the imidazole compound is 2-ethyl-4-methylimidazole or 1-benzyl-2-methylimidazole.

10. A composition as claimed in claim 1, wherein the acid anhydride is used in an amount of 0.5–1.5 mole per one equivalent of the epoxy group of the Bisphenol epoxy resin.

11. A composition as claimed in claim 1, wherein the imidazole compound is used in an amount of 0.2–5.0% based on the weight of the acid anhydride.

12. A composition as claimed in claim 1, wherein said reactive diluent is selected from the group consisting of phenyl glycidyl ether, polyethylene glycol diglycidyl ether, polypropylene glycol diglycidyl ether, 1,6-hexanediol diglycidyl ether, methyl glycidyl ether, propyl glycidyl ether, pentaerithrytol polyglycidyl ether, sorbitol polyglydidyl ether and 2-ethylhexyl glycidyl ether.

13. A composition as claimed in claim 1, wherein the polyether polyol is at least one of the compounds expressed by the following formulas:

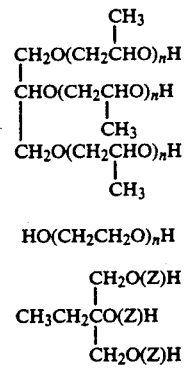

wherein n is a positive integer and Z is a polyoxyalkylene group consisting essentially of a plurality of monomer units, the monomer unit being selected from an ethylene oxide monomer unit ($-CH_2CH_2O-$) and a propylene oxide monomer unit ($-CH_2CHCH_3O-$) or mixtures thereof.

14. A composition as claimed in claim 1, and being a two-component pack consisting of said mixture (A) as a first component and said curing agent (B) as a second component.

* * * * *